US008944718B2

(12) United States Patent
Smith

(10) Patent No.: US 8,944,718 B2
(45) Date of Patent: Feb. 3, 2015

(54) CLAMPING BUSHING

(75) Inventor: Wayne A. Smith, Holland Patent, NY (US)

(73) Assignee: C-Flex Bearing Co., Inc.

(*) Notice: Subject to any disclaimer, the term of this patent is extended or adjusted under 35 U.S.C. 154(b) by 501 days.

(21) Appl. No.: 12/889,085

(22) Filed: Sep. 23, 2010

(65) Prior Publication Data

US 2012/0076575 A1 Mar. 29, 2012

(51) Int. Cl.
| F16D 1/00 | (2006.01) |
| F16D 1/08 | (2006.01) |
| B23P 11/00 | (2006.01) |
| F16D 1/06 | (2006.01) |

(52) U.S. Cl.
CPC .............. *F16D 1/0847* (2013.01); *B23P 11/00* (2013.01); *F16D 2001/062* (2013.01)
USPC ......................................................... 403/371

(58) Field of Classification Search
USPC .................................. 403/371, 367, 366, 372
See application file for complete search history.

(56) References Cited

U.S. PATENT DOCUMENTS

| 66,296 A | 7/1867 | Brown |
| 70,488 A | 11/1867 | Wilcox |
| RE3,878 E | 3/1870 | Barlow et al. |
| RE3,965 E | 5/1870 | Hunt |
| 104,013 A | 6/1870 | Garrick |
| 138,221 A | 4/1873 | Young |
| 172,094 A | 1/1876 | Curran |
| 186,916 A | 1/1877 | Young |
| 249,593 A | 11/1881 | Delkescamp |
| 257,750 A | 5/1882 | Parcelle |
| 271,035 A | 1/1883 | Carpenter |
| 280,032 A | 6/1883 | Green |
| 545,800 A | 9/1895 | Kempshall |
| 548,558 A | 10/1895 | Kempshall |
| 551,970 A | 12/1895 | Kempshall |
| 553,164 A | 1/1896 | Kempshall |
| 554,624 A | 2/1896 | Kempshall |
| 568,687 A | 9/1896 | Kempshall |
| 569,970 A | 10/1896 | Kempshall |
| 582,359 A | 5/1897 | Look |
| 606,061 A | 6/1898 | Kempshall |
| 608,272 A | 8/1898 | Schleicher |
| 624,150 A | 5/1899 | Andrus |
| 639,997 A | 12/1899 | Kempshall |

(Continued)

OTHER PUBLICATIONS

TB Wood's Incorporated Sure-Grip® Bushing Part Specification accessed On-line at www.tbwoods.com on Sep. 22, 2010 (9 pages).

*Primary Examiner* — Daniel P Stodola
*Assistant Examiner* — Daniel Wiley
(74) *Attorney, Agent, or Firm* — Heslin Rothenberg Farley & Mesiti P.C.; George S. Blasiak, Esq.

(57) ABSTRACT

There is set forth herein a bushing comprising a longitudinally extending cylindrical body having an inner surface and an outer surface, the longitudinally extending cylindrical body further having a longitudinally extending slit. In one embodiment the bushing can comprise a longitudinally extending formation formed on the longitudinally extending cylindrical body. The longitudinally extending formation can be located at a radially position of the cylindrical body spaced apart from a radial position of the longitudinally extending slit. The longitudinally extending cylindrical body can be configured so that the longitudinally extending cylindrical body preferentially deforms along the longitudinally extending formation.

19 Claims, 10 Drawing Sheets

(56) References Cited

U.S. PATENT DOCUMENTS

| | | | |
|---|---|---|---|
| 674,435 A | 5/1901 | Cooke | |
| 688,431 A | 12/1901 | Neubert | |
| 688,786 A | 12/1901 | Linch | |
| 689,221 A | 12/1901 | Teck | |
| 813,575 A | 2/1906 | Nichols | |
| 889,455 A | 6/1908 | Glass | |
| 914,705 A | 3/1909 | Donnelly et al. | |
| 1,049,022 A | 12/1912 | Wilson | |
| 1,088,221 A | 2/1914 | Gray | |
| 1,106,964 A | 8/1914 | Pahler | |
| 1,297,142 A | 3/1919 | Gibbons | |
| D53,813 S | 9/1919 | Bruns | |
| D57,976 S | 5/1921 | Joassart | |
| D59,384 S | 10/1921 | Sleicher | |
| D59,782 S | 11/1921 | Roth | |
| 1,410,900 A | 3/1922 | Durr | |
| 1,481,217 A | 1/1924 | Maloy | |
| 1,527,023 A | 2/1925 | Bowden | |
| 1,591,183 A | 7/1926 | Reynolds | |
| 1,640,543 A | 8/1927 | Gudge | |
| 1,697,814 A | 1/1929 | Forbes | |
| 2,170,708 A | 8/1939 | Cordeiro | |
| 2,188,596 A | 1/1940 | Hobert | |
| 2,355,126 A | 8/1942 | Webster et al. | |
| 2,367,836 A | 1/1945 | Brown | |
| 2,393,984 A | 2/1946 | Gookin | |
| 2,518,851 A | 8/1950 | Anderson | |
| 2,559,759 A | 7/1951 | Swart | |
| 2,583,719 A | 1/1952 | White | |
| 2,586,528 A | 2/1952 | Gerson | |
| 2,590,332 A | 3/1952 | Levin | |
| 2,663,895 A | 12/1953 | Petri | |
| 2,700,172 A | 1/1955 | Rohe | |
| 2,897,533 A | 8/1959 | Bull et al. | |
| 2,912,712 A | 11/1959 | Shamban et al. | |
| 2,938,698 A * | 5/1960 | Johnson | 248/314 |
| 2,957,196 A | 10/1960 | Kreider et al. | |
| 2,994,933 A | 8/1961 | Wolfe | |
| 3,016,562 A | 1/1962 | Reid | |
| 3,048,911 A | 8/1962 | Almon | |
| 3,057,001 A | 10/1962 | Rapata | |
| 3,082,470 A | 3/1963 | Fork | |
| 3,091,795 A | 6/1963 | Budwig | |
| 3,137,887 A | 6/1964 | Mannino et al. | |
| 3,161,906 A | 12/1964 | Yarm | |
| 3,204,284 A | 9/1965 | Merriman | |
| 3,264,677 A | 8/1966 | Olson | |
| 3,328,854 A | 7/1967 | Tombari | |
| 3,351,974 A | 11/1967 | Wilhelmi | |
| 3,372,441 A | 3/1968 | Fisher | |
| 3,399,435 A | 9/1968 | Ackerman | |
| 3,507,508 A * | 4/1970 | Andrews | 279/83 |
| 3,516,111 A | 6/1970 | Heyman | |
| 3,562,847 A | 2/1971 | Jemison | |
| 3,643,290 A | 2/1972 | Milne | |
| 3,678,535 A | 7/1972 | Charles | |
| 3,768,115 A | 10/1973 | Hoffmann et al. | |
| 3,894,309 A | 7/1975 | Yuda | |
| 3,895,408 A | 7/1975 | Leingang | |
| 3,895,409 A | 7/1975 | Kwatonowski | |
| 3,929,392 A * | 12/1975 | Ogino | 384/215 |
| 3,979,798 A | 9/1976 | Meyer | |
| 3,986,228 A | 10/1976 | Dowse | |
| 4,106,156 A | 8/1978 | Fisher et al. | |
| 4,112,993 A | 9/1978 | Dey | |
| 4,134,175 A | 1/1979 | Contoyanis | |
| 4,137,602 A | 2/1979 | Klumpp, Jr. | |
| 4,144,616 A | 3/1979 | Gould et al. | |
| 4,321,726 A | 3/1982 | Rogers, Jr. et al. | |
| 4,330,903 A * | 5/1982 | Vilotti | 452/92 |
| 4,344,205 A | 8/1982 | Latino et al. | |
| 4,372,013 A | 2/1983 | Gautier, Jr. | |
| 4,397,061 A | 8/1983 | Kanzaka | |
| 4,407,042 A | 10/1983 | Schramme et al. | |
| 4,433,452 A | 2/1984 | Frano | |
| 4,630,330 A | 12/1986 | Keller et al. | |
| 4,675,937 A | 6/1987 | Mitomi | |
| 4,685,172 A | 8/1987 | O'Connor | |
| 4,799,288 A | 1/1989 | Kimizawa | |
| 4,821,368 A | 4/1989 | Albrecht | |
| 4,843,675 A | 7/1989 | Diamantis | |
| 4,864,684 A | 9/1989 | Gellenthin, Jr. | |
| 4,887,331 A | 12/1989 | Thomas | |
| 4,922,573 A | 5/1990 | Miller et al. | |
| 4,958,966 A * | 9/1990 | Andrews | 408/239 A |
| 5,031,268 A | 7/1991 | McCabe | |
| 5,080,536 A * | 1/1992 | Andrews | 408/239 A |
| 5,092,016 A | 3/1992 | Soong | |
| 5,093,957 A | 3/1992 | Do | |
| 5,103,529 A | 4/1992 | Konig | |
| 5,107,569 A | 4/1992 | Hughes | |
| 5,203,051 A | 4/1993 | Tonami et al. | |
| 5,222,988 A | 6/1993 | Riley | |
| 5,304,101 A | 4/1994 | Baer | |
| 5,504,973 A | 4/1996 | Kameyama | |
| 5,526,549 A | 6/1996 | Mori et al. | |
| 5,537,713 A | 7/1996 | Docteur | |
| 5,537,714 A | 7/1996 | Lynch, Jr. et al. | |
| 5,601,295 A * | 2/1997 | Baker | 279/46.5 |
| 5,611,110 A | 3/1997 | Smith, Jr. | |
| 5,628,087 A | 5/1997 | Gretz | |
| 5,647,685 A * | 7/1997 | Fukui et al. | 403/370 |
| 5,659,924 A | 8/1997 | Gildersleeve | |
| 5,701,634 A | 12/1997 | Uemura et al. | |
| 5,774,934 A | 7/1998 | Fujita et al. | |
| 5,777,274 A | 7/1998 | Kawase | |
| 5,789,706 A | 8/1998 | Perkins | |
| 5,806,139 A | 9/1998 | Anderson et al. | |
| 5,806,140 A | 9/1998 | Carlson et al. | |
| 5,850,670 A | 12/1998 | Boskovic | |
| 5,870,799 A | 2/1999 | Benda | |
| 5,950,277 A | 9/1999 | Tallmadge et al. | |
| 5,950,381 A | 9/1999 | Stansbie | |
| 5,954,344 A | 9/1999 | Miller | |
| 5,981,877 A | 11/1999 | Sakata et al. | |
| 5,983,450 A | 11/1999 | Pratt | |
| 6,015,197 A | 1/2000 | DiGiacomo et al. | |
| 6,025,557 A | 2/2000 | Daoud | |
| 6,047,441 A | 4/2000 | Moorman | |
| 6,058,562 A | 5/2000 | Satou et al. | |
| 6,059,294 A | 5/2000 | Gorce | |
| 6,061,870 A | 5/2000 | Dodge et al. | |
| 6,068,344 A | 5/2000 | Nether | |
| 6,070,928 A | 6/2000 | Campbell | |
| 6,073,890 A | 6/2000 | Daoud | |
| 6,080,933 A | 6/2000 | Gretz | |
| 6,088,874 A | 7/2000 | Nakata et al. | |
| 6,088,875 A | 7/2000 | Ono et al. | |
| 6,088,876 A | 7/2000 | Daoud | |
| 6,101,674 A | 8/2000 | Furuya et al. | |
| 6,147,307 A | 11/2000 | Ling et al. | |
| 6,150,608 A | 11/2000 | Wambeke et al. | |
| 6,151,759 A | 11/2000 | Harward | |
| 6,233,782 B1 | 5/2001 | Regele et al. | |
| 6,240,597 B1 | 6/2001 | Mochizuki | |
| 6,301,745 B1 | 10/2001 | Leibman | |
| 6,341,405 B1 | 1/2002 | Uchida | |
| 6,374,455 B1 | 4/2002 | Regele et al. | |
| 6,378,167 B1 | 4/2002 | Howell, III et al. | |
| 6,389,642 B1 | 5/2002 | Coombs | |
| 6,430,774 B1 | 8/2002 | McLaughlin et al. | |
| 6,442,794 B2 | 9/2002 | Uchida et al. | |
| 6,484,358 B1 | 11/2002 | Duong et al. | |
| 6,553,615 B1 | 4/2003 | Hansen et al. | |
| 6,557,208 B2 | 5/2003 | Huet | |
| 6,637,070 B2 | 10/2003 | Katayama et al. | |
| 6,675,439 B1 | 1/2004 | Hashimoto | |
| 6,694,566 B1 | 2/2004 | Mockett | |
| 6,708,366 B2 | 3/2004 | Ono et al. | |
| 6,779,232 B2 | 8/2004 | Cerul | |
| 6,792,650 B2 | 9/2004 | Stagg et al. | |
| 6,868,580 B1 | 3/2005 | Diggs | |
| 6,877,184 B2 | 4/2005 | Mockett | |
| 6,895,634 B2 | 5/2005 | Tisbo | |

(56) References Cited

U.S. PATENT DOCUMENTS

| | | |
|---|---|---|
| 6,898,822 B2 | 5/2005 | Nordquist et al. |
| 6,901,627 B2 | 6/2005 | Uchida |
| 6,901,628 B2 | 6/2005 | Cerul |
| 7,047,596 B2 | 5/2006 | Sucic et al. |
| 7,100,237 B2 | 9/2006 | Katayama |
| 7,124,468 B2 | 10/2006 | Mockett |
| 7,155,775 B2 | 1/2007 | Mockett |
| 7,156,334 B1 | 1/2007 | Fore, Sr. et al. |
| 7,156,468 B2 | 1/2007 | Neil |
| 7,178,226 B2 | 2/2007 | Manning |
| 7,179,039 B2 | 2/2007 | Schwartz et al. |
| 7,188,543 B1 | 3/2007 | Andrews et al. |
| 7,222,394 B2 | 5/2007 | Gardner |
| 7,383,610 B2 | 6/2008 | Mockett |
| 7,418,765 B2 | 9/2008 | Kameyama |
| 7,544,901 B2 | 6/2009 | Ehmann |
| 7,555,818 B2 | 7/2009 | Erskine et al. |
| 7,575,256 B2 | 8/2009 | Smith, III |
| 7,579,556 B2 | 8/2009 | Tapper |
| 7,579,557 B2 | 8/2009 | Tapper |
| 7,582,836 B2 | 9/2009 | Tapper |
| 7,594,746 B2 | 9/2009 | Shin et al. |
| 7,601,918 B2 | 10/2009 | Pamperin |
| 7,614,875 B2 | 11/2009 | Katsuda et al. |
| 7,770,258 B2 | 8/2010 | Rozkowski |
| 7,784,150 B2 | 8/2010 | Anderson et al. |
| 7,788,766 B2 | 9/2010 | Mockett |
| 2001/0044984 A1 | 11/2001 | Ono et al. |
| 2001/0049857 A1 | 12/2001 | Uchida et al. |
| 2001/0049858 A1 | 12/2001 | Huet |
| 2002/0004967 A1 | 1/2002 | Saeki et al. |
| 2002/0038492 A1 | 4/2002 | Hashimoto |
| 2002/0100139 A1 | 8/2002 | Rowley |
| 2002/0104187 A1 | 8/2002 | Kakamu et al. |
| 2002/0138942 A1 | 10/2002 | Sato et al. |
| 2002/0178538 A1 | 12/2002 | Matsushita |
| 2002/0194701 A1 | 12/2002 | Benda |
| 2003/0061679 A1 | 4/2003 | Chang et al. |
| 2003/0061680 A1 | 4/2003 | Uchida |
| 2003/0066161 A1 | 4/2003 | Wittschen |
| 2003/0079311 A1 | 5/2003 | Yamamoto et al. |
| 2003/0084538 A1 | 5/2003 | Fukumoto et al. |
| 2003/0097728 A1 | 5/2003 | Tisol et al. |
| 2003/0121122 A1 | 7/2003 | Carlstedt et al. |
| 2003/0131443 A1 | 7/2003 | Trent |
| 2003/0159242 A1 | 8/2003 | Cerul |
| 2003/0226233 A1 | 12/2003 | Katayama |
| 2003/0226234 A1 | 12/2003 | Katayama |
| 2004/0016079 A1 | 1/2004 | Kameyama |
| 2004/0074045 A1 | 4/2004 | Winstead et al. |
| 2004/0078926 A1 | 4/2004 | May et al. |
| 2004/0107533 A1 | 6/2004 | Nishihara et al. |
| 2004/0123420 A1 | 7/2004 | Mockett |
| 2004/0226131 A1 | 11/2004 | Cervl |
| 2005/0076469 A1 | 4/2005 | Tisbo |
| 2005/0081328 A1 | 4/2005 | Mockett |
| 2005/0115019 A1 | 6/2005 | Sanroma et al. |
| 2005/0125946 A1 | 6/2005 | Sucic et al. |
| 2005/0229357 A1 | 10/2005 | Remy et al. |
| 2005/0241103 A1 | 11/2005 | Dobson et al. |
| 2006/0004366 A1 | 1/2006 | Cerul |
| 2006/0123591 A1 | 6/2006 | Mockett |
| 2006/0196005 A1 | 9/2006 | Mockett |
| 2006/0200936 A1 | 9/2006 | Gardner |
| 2006/0248681 A1 | 11/2006 | Trotter et al. |
| 2007/0119017 A1 | 5/2007 | Trotter et al. |
| 2007/0271728 A1 | 11/2007 | Byeon |
| 2008/0047095 A1 | 2/2008 | Weiss et al. |
| 2008/0163452 A1 | 7/2008 | Ball et al. |
| 2008/0163453 A1 | 7/2008 | Joseph |
| 2008/0163454 A1 | 7/2008 | Olsson et al. |
| 2008/0178421 A1 | 7/2008 | Mockett |
| 2008/0222841 A1 | 9/2008 | Morales Arnaez |
| 2008/0244861 A1 | 10/2008 | Miyamoto et al. |
| 2009/0019664 A1 | 1/2009 | Abram |
| 2009/0064454 A1 | 3/2009 | Anderson et al. |
| 2009/0119872 A1 | 5/2009 | Chien |
| 2009/0126148 A1 | 5/2009 | Tripont |
| 2009/0165243 A1 | 7/2009 | Yazdi |
| 2009/0249581 A1 | 10/2009 | Bost, Jr. |
| 2009/0265884 A1 | 10/2009 | Losberger |
| 2009/0265885 A1 | 10/2009 | Robertson et al. |
| 2009/0293226 A1 | 12/2009 | Widemark et al. |
| 2010/0000045 A1 | 1/2010 | Eriksson |
| 2010/0011535 A1 | 1/2010 | Schuelke |
| 2010/0043171 A1 | 2/2010 | Kwon |
| 2010/0050374 A1 | 3/2010 | Abare |
| 2010/0050375 A1 | 3/2010 | Ueyama |
| 2010/0101045 A1 | 4/2010 | Van Walraven et al. |
| 2010/0115728 A1 | 5/2010 | Kamenoue |
| 2010/0139034 A1 | 6/2010 | Shen |
| 2010/0139035 A1 | 6/2010 | Magennis et al. |
| 2010/0154162 A1 | 6/2010 | Ramirez Blanco et al. |
| 2010/0162519 A1 | 7/2010 | Gain |
| 2010/0186191 A1 | 7/2010 | Mares et al. |
| 2010/0212107 A1 | 8/2010 | Milton |

* cited by examiner

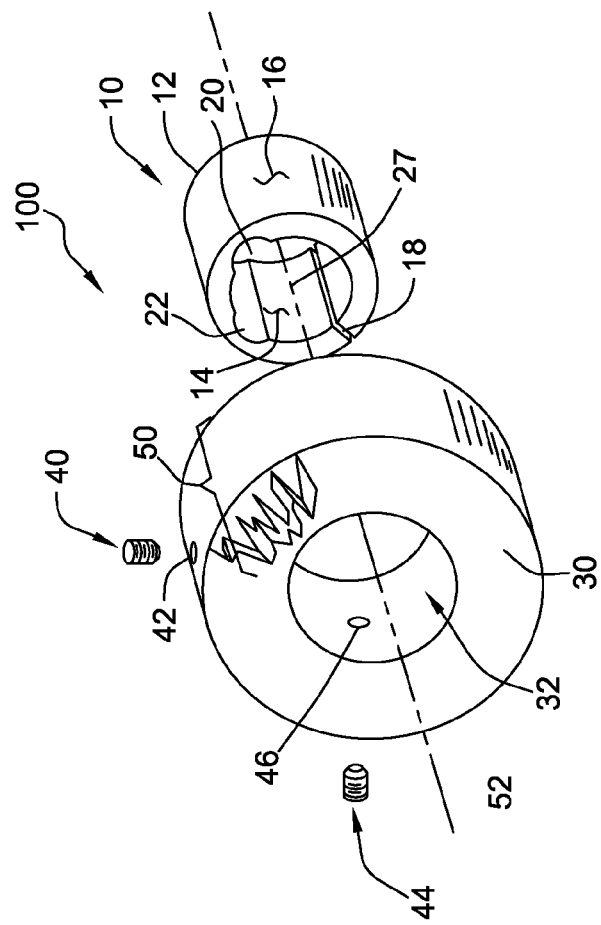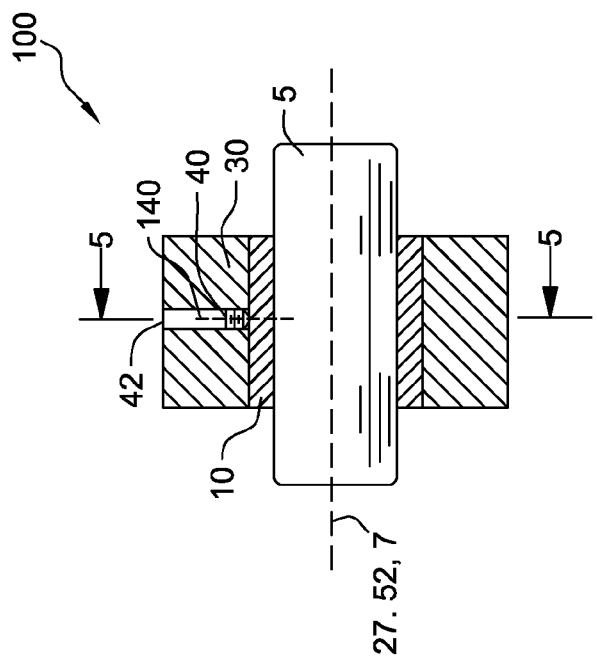

CLAMPING BUSHING

FIELD OF THE INVENTION

The invention relates to mechanical apparatus in general and in particular to a clamping bushing

BACKGROUND OF THE PRIOR ART

Mechanical apparatuses can be joined to a round shaft for the purpose of transmitting torque from the shaft to the apparatus, or vice versa, a means must exist to connect the apparatus to the shaft for this purpose. Prior art apparatuses have used a variety of means for joining to a shaft, including set screws which impinge directly on the shaft through the apparatus. This method is crude and frequently results in slippage and scoring of the shaft if excessive torque is input, or the screws are not tightened properly due to the small surface area contact of the screws on the shaft. Improved methods have been proposed and utilized, such as split hubs, or bushings which can be inserted into an apparatus, and then compressed with a set screw(s). Clamping methods associated with these prior art types utilize a common concept of applying force on the outside of a bushing which has a cylindrical bore. Since in practice the shaft and bore of the apparatus and bushing are not exactly equal in size or shape, it is normal that contact exists between a cylindrical shaft and a clamping bushing or apparatus with a cylindrical bore, only in limited areas. Even in designs where clamping is applied upon opposite sides of a bushing or apparatus with a cylindrical bore, it is possible that only two lines of contact extending axially along the two areas of contact that exist between the shaft and the apparatus as the apparatus is forced to collapse onto the shaft.

SUMMARY OF THE INVENTION

There is set forth herein a bushing comprising a longitudinally extending cylindrical body having an inner surface and an outer surface, the longitudinally extending cylindrical body further having a longitudinally extending slit. In one embodiment the bushing can comprise a longitudinally extending formation formed on the longitudinally extending cylindrical body. The longitudinally extending formation can be located at a radial position of the cylindrical body spaced apart from a radial position of the longitudinally extending slit. The longitudinally extending cylindrical body can be configured so that the longitudinally extending cylindrical body preferentially deforms along the longitudinally extending formation.

BRIEF DESCRIPTION OF THE DRAWINGS

Features described herein can be better understood with reference to the drawings described below. The relative dimensions of features depicted in the drawings herein represent specific embodiments of the invention. However, it is understood that apparatus, systems, and methods herein can be provided with use of relative dimensions other than those specifically set forth in the drawings. In the drawings, like numerals are used to indicate like parts throughout the various views.

FIG. 3 is an exploded perspective view, partly in section, illustrating for securing an apparatus in relation to a shaft utilizing a bushing;

FIG. 4 is a sectional side view of the systems as illustrated in FIG. 3;

DETAILED DESCRIPTION OF THE INVENTION

Figure 1:
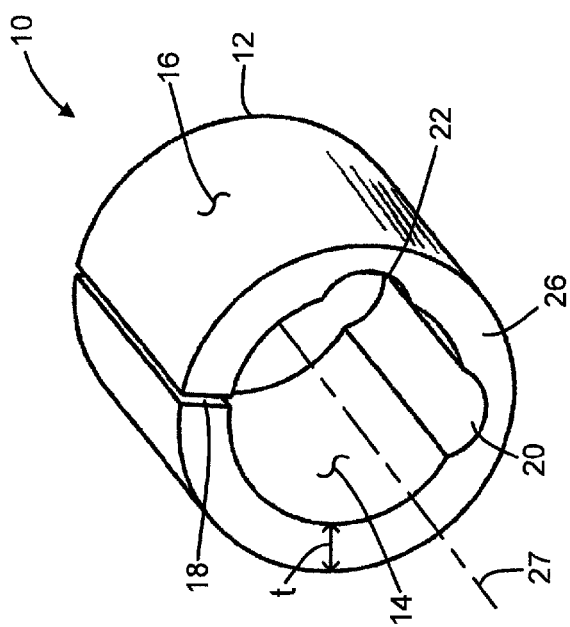
FIG. 1 is a perspective view of a first embodiment of a bushing.

Referring to FIG. 1, there is set forth herein a bushing 10 with a central axis 27 comprising a longitudinally extending cylindrical body 12 having an inner surface 14 and an outer surface 16, the longitudinally extending cylindrical body further having a longitudinally extending slit 18. In one embodiment, the bushing 10 can comprise one or more longitudinally extending formation 20, 22 formed on the longitudinally extending cylindrical body 12. The one or more longitudinally extending formation 20, 22 can be radially spaced from the longitudinally extending slit 18. The longitudinally extending cylindrical body 12 can be configured so that the longitudinally extending cylindrical body 12 preferentially deforms along the one or more longitudinally extending formation 20, 22. Bushing 10 can be configured so that bushing 10 deforms along one or more longitudinally extending formations thereof, e.g., formation 20, formation 22 in response to a manually generated force, e.g., a force imparted by manually driving a set screw through a hub to impart a force on an outer surface 16 of bushing 10 as will be set forth herein. In the embodiment of FIG. 1, each of inner surface 14 and outer surface 16 define a cylindrical shape. In another embodiment, one of inner surface 14 and outer surface 16 define a cylindrical shape. A motor force can also be utilized to deform bushing 10 along one or more formation 20, 22.

In one embodiment, cylindrical body 12 can have first and second longitudinally extending formations 20, 22 for encouraging preferential deformation of the cylindrical body 12 along the one or more formation 20, 22. The first longitudinally extending formation 20 can be radially disposed at a radial position on cylindrical body 12 substantially opposite of slit 18. The second longitudinally extending formation 22 can be disposed at a radial position intermediate of slit 18 and formation 20 and can be disposed at a radial position at about 90 degrees from slit 18 and about 90 degrees from formation 20. The second longitudinally extending formation can be regarded as a supplementary longitudinally extending formation. The second longitudinally extending formation 22 can be more proximal to slit 18 than formation 20 and can be spaced apart from formation 20. The exemplary 180 degree and 90 degree radial positions can be regarded alternatively as 6 o'clock and 3 o'clock radial positions respectively. The radial position of formation 20 can be other than 180 degrees. The radial position of formation 22 can be other than 90 degrees. The shape, size, and/or depth of the first and second longitudinally extending formations can be varied. Referring to the embodiment of FIG. 1, longitudinally extending formations 20, 22 can have arcuate cross-sections. Longitudinally extending cylindrical body 12 can have a length less than, greater than, or equal to a diameter thereof.

Figure 2:
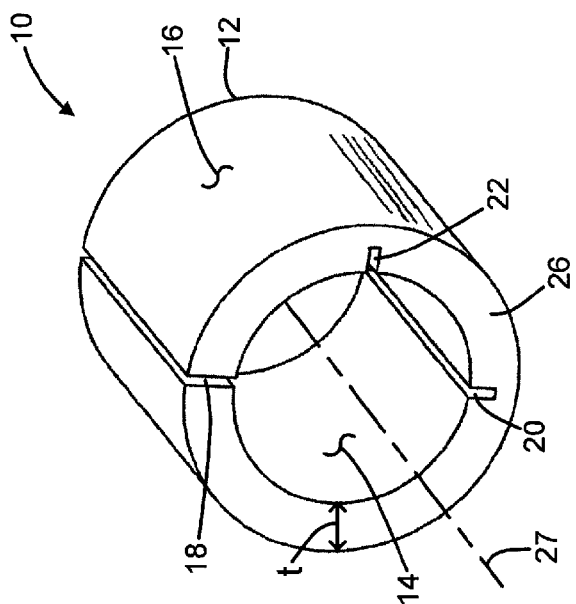
FIG. 2 is a perspective view of a second embodiment of a bushing.

Referring to the alternative embodiment of FIG. 2, longitudinally extending formations 20 and 22 can have rectilinear cross-sections. As shown in FIGS. 1 and 2, cylindrical body 12 can be defined by a cylindrical wall 26 having a substantively uniform thickness, t, except in the areas of slit 18 and formations 20, 22. In one embodiment, slit 18 can extend an entire thickness, t, of wall 26. Formations 20, 22 can extend less than an entire thickness of wall 26. Formations 20, 22 in FIGS. 1 and 2 are shown partially defining an inner surface 14 of bushing 10. However, formations 20, 22 can, in addition or alternatively, partially define outer surface 16 or can be defined internally relative to wall 26 (e.g., can be longitudinally formed through wall 26 without defining either of inner surface 14 or outer surface 16). In one embodiment, a radial position of formation 20 and a radial position of formation 22 can remain substantially constant through a length of bushing 10. In another embodiment, a radial position of one or more of formation 20 or formation 22 varies so that a spacing distance between formation 20 and formation 22 varies throughout a length of bushing 10. In one embodiment, formation 20 and formation 22 can remain spaced apart throughout an entire length of bushing 10.

In FIG. 3 there is shown a bushing 10 and an apparatus 30. In one embodiment, apparatus 30 can be an apparatus in the form of a hub of a larger assembly 50. The larger assembly 50, in one embodiment, can be e.g., a coupling for providing coupling between a first rotating shaft and a second shaft to be rotated. In another aspect, apparatus 30 can include a bore 32. Apparatus 30 can have a longitudinally extending axis 52. In one embodiment, an outer surface and an inner surface of apparatus 30 (defining bore 32) can be cylindrical as shown in FIG. 3.

In one embodiment, it can be advantageous to arrange bushing 10 in radial alignment (i.e., with bushing at a proper position of rotation about axis 27) prior to insertion of the bushing 10 and apparatus 30 into the bore 32 of apparatus 30. Bushing 10 and apparatus 30 can be regarded to be properly aligned when set screws 40 and 44 as set forth herein can impinge a bushing 10 at a desired position of bushing 10. In one embodiment, bushing 10 can include a tapped hole 42 and tapped hole 46 formed therein. Bushing 10 can be radially aligned with apparatus 30 in one embodiment such that set screw 40 will impinge through tapped hole 42 during tightening in an area between longitudinally extending formation 20 and longitudinally extending formation 22, and set screw 44 will impinge on the outer surface 16 of the bushing's cylindrical body 12 through tapped hole 46 between longitudinally extending formation 22 and slit 18. Set screw 40 and set screw 44 can impart a force to bushing 10 when impinging thereon.

In one example, as described with reference to FIGS. 3-10, a bushing 10 as described herein can be utilized in a system 100 for clamping an apparatus 30 to a shaft 5 having an axis 7. An example of such system 100 is shown in FIG. 4. When apparatus 30 is properly clamped to shaft 5, the apparatus 30 can be restrained from axial (in the direction of an axis of the shaft) or rotational movement (in a direction about an axis of the shaft) relative to the shaft 5. In the views of FIGS. 5-10, reference lines 1 and 11 are included to indicate radial positions of bushing 10 including cylindrical body 12. Line 1 intersects cylindrical body 12 at a 270 degree radial position of cylindrical body 12 and a 90 degree radial position of cylindrical body 12. Line 11 intersects cylindrical body 12 at a zero degree radial position of cylindrical body 12 and a 180 degree radial position of cylindrical body 12.

In one example described, force can be imparted to outer surface 16 of the longitudinally extending cylindrical body 12 defining bushing 10 utilizing first and second set screws 40, 44. The set screws 40, 44 can be driven through the apparatus 30 at radial positions of apparatus 30 that are substantially 90 degrees from each other so that they impart forces to the outer surface of the bushing cylindrical body 12 at radial positions of cylindrical body 12 that are substantially 90 degrees from one another. The bushing 10 can be arranged relative to apparatus 30 in an alignment such that radial position of the first set screw 40 can be generally aligned in a radial position of cylindrical body 12 located between the first longitudinally extending formation 20 and second formation 22, and the second set screw 44 can be generally aligned in a radial position of cylindrical body 12 located between the second longitudinally extending formation 22 and the slit 18.

Figure 6:
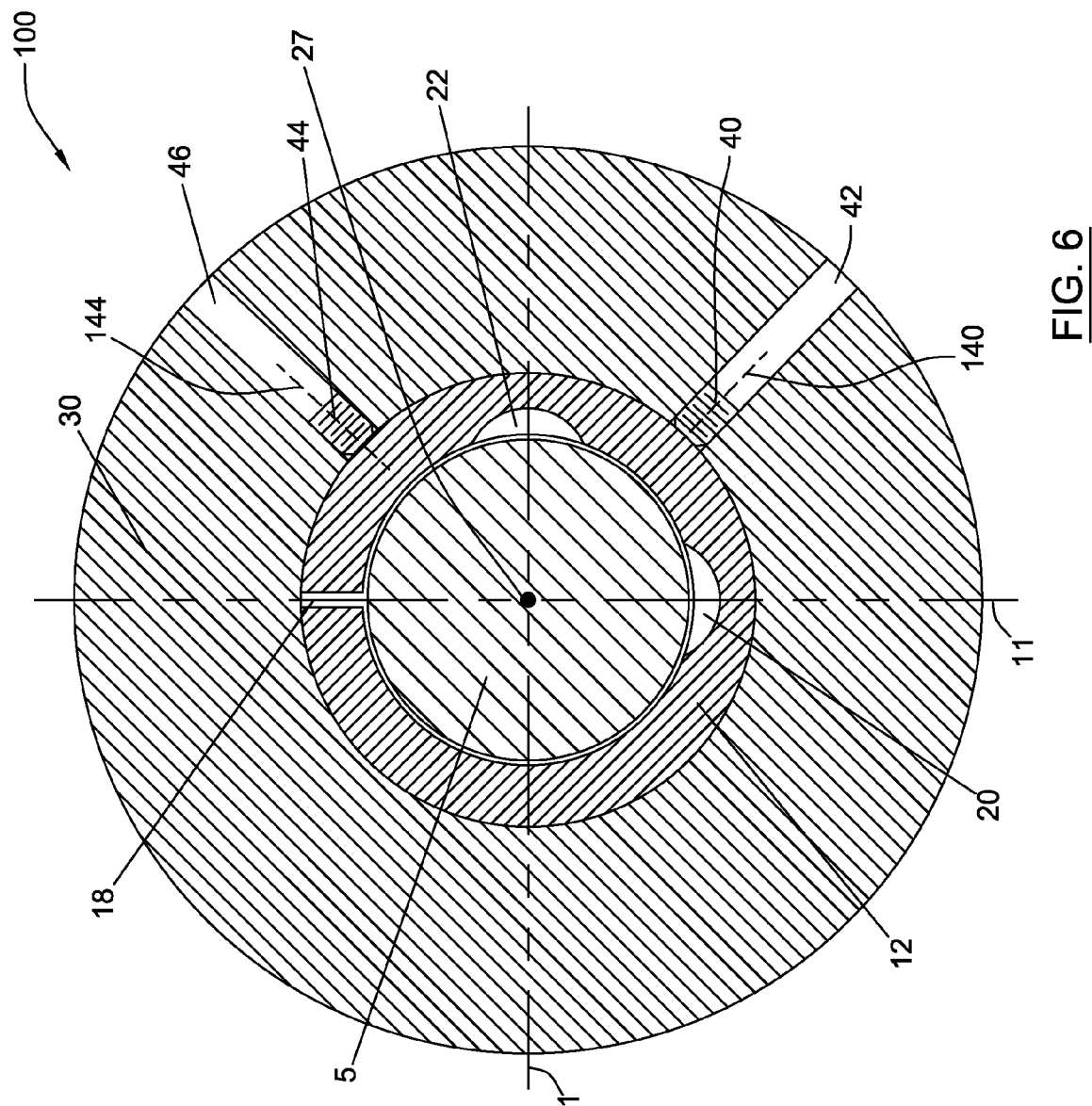

In one example, the set screws 40, 44 can be tightened in a sequential manner, with the first set screw 40 tightened first (FIG. 6). Tightening in such manner with first set screw 40 tightened first causes the bushing portion between the first and second longitudinally extending formation to bend as a lever with its pivot point at the first longitudinally extending formation 20 until cylindrical body 12 contacts the shaft 5 at which time it creates clamping force between the bushing 10 and the shaft 5 as shown in FIG. 6.

Figure 7:
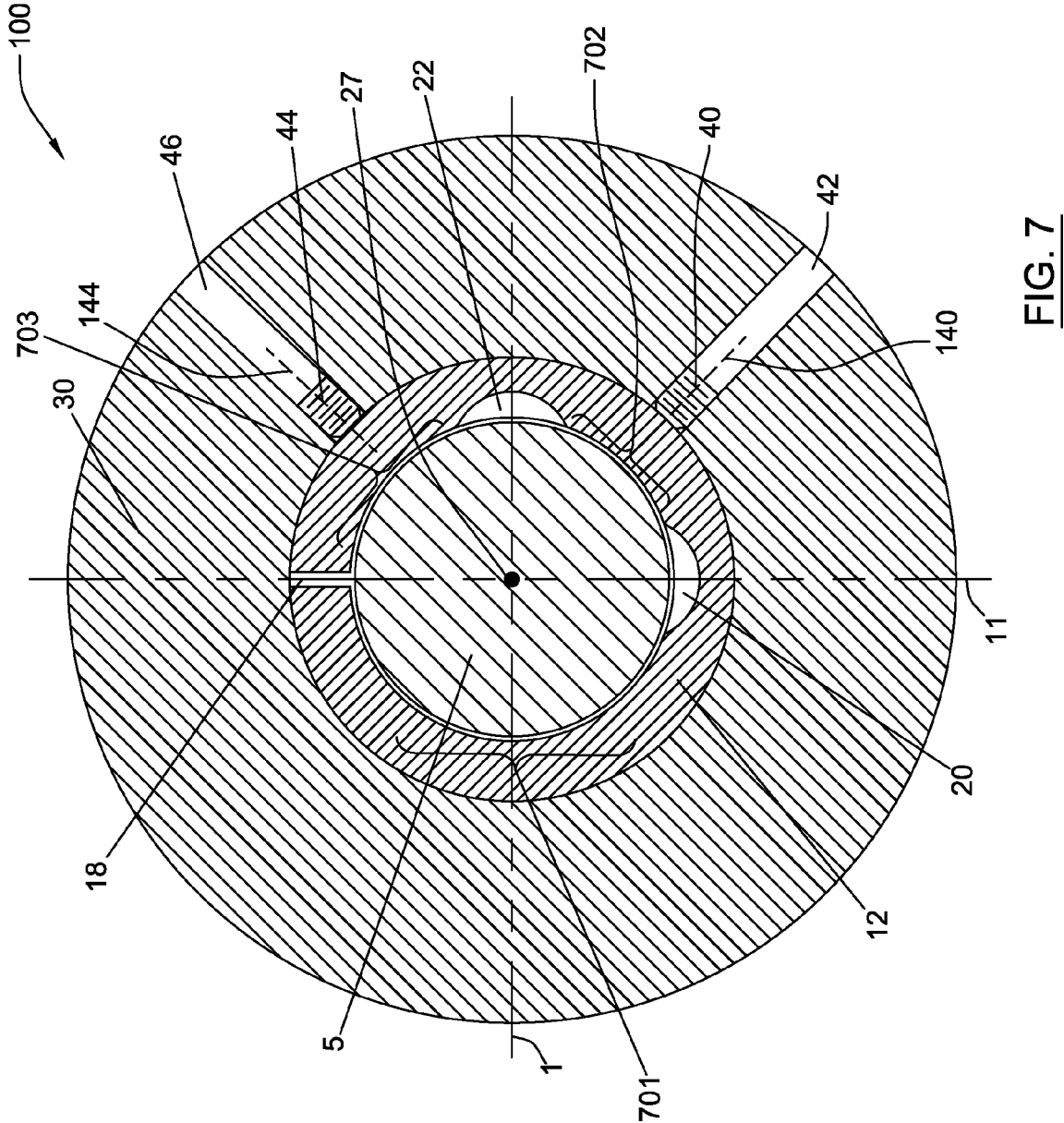
Figure 12:
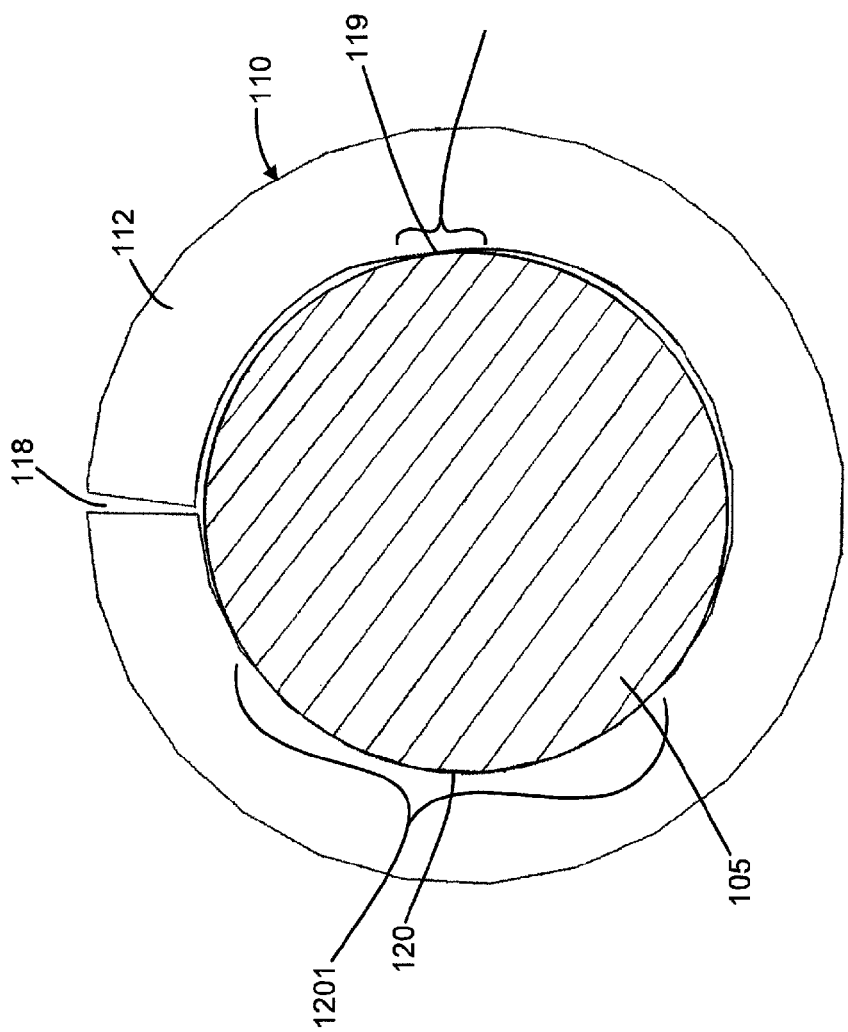
FIG. 12 is a diagram illustrating a prior art system for securing.

After the first set screw 40 has been tightened, the second set screw 44 can be tightened. Tightening of the second set screw 44 can cause the longitudinally extending cylindrical body 12 between the second longitudinally extending formation 22 and the slit 18 to bend as a lever with its pivot point at the second longitudinally extending formation 22 until it contacts the shaft 5 as shown in FIG. 7 at which time it creates clamping force between the bushing 10 and the shaft 5. The sequential tightening of set screws 40 and 44 creates as best seen in FIG. 7, a minimum of three regions of contact 701, 702, 703 between bushing 10 and shaft 5. These three regions of contact can be generally linear regions that extend through a length of bushing 10. Each region of contact increases the frictional resistance to relative motion between the bushing and shaft. Accordingly, a major advantage over prior art designs is provided. By contrast, a known prior art design as shown in FIG. 12 can result in only two regions of contact, 1201, 1202.

By clamping the area between formation 20 and formation 22, before clamping an area between formation 22 and slit 18, a "bowing" effect can be avoided. It can be seen that if the area between formation 22 and slit 18 is clamped prior to clamping the area between formation 20 and formation 22, the area between formation 20 and formation 22 can tend to bow out so that inner surface 14 is separated from shaft 5 at the radial position between formation 20 and formation 22. With the area between formation 20 and formation 22 in a bowed out state, clamping of the area may not result in good contact of an inner surface 14 of bushing 10 to shaft 5. With the area between formation 20 and formation 22 bowed out, a possible result is a dimple formation in bushing 10 being formed at the location of a set screw 40. The dimple can contact shaft 5, but since the dimple can be about the divot of screw 40, the region of contact can be relatively small. In some instances it is preferred to clamp an area between formation 22 and slit 18 prior to clamping an area between formation 20 and formation 22.

Figure 5:
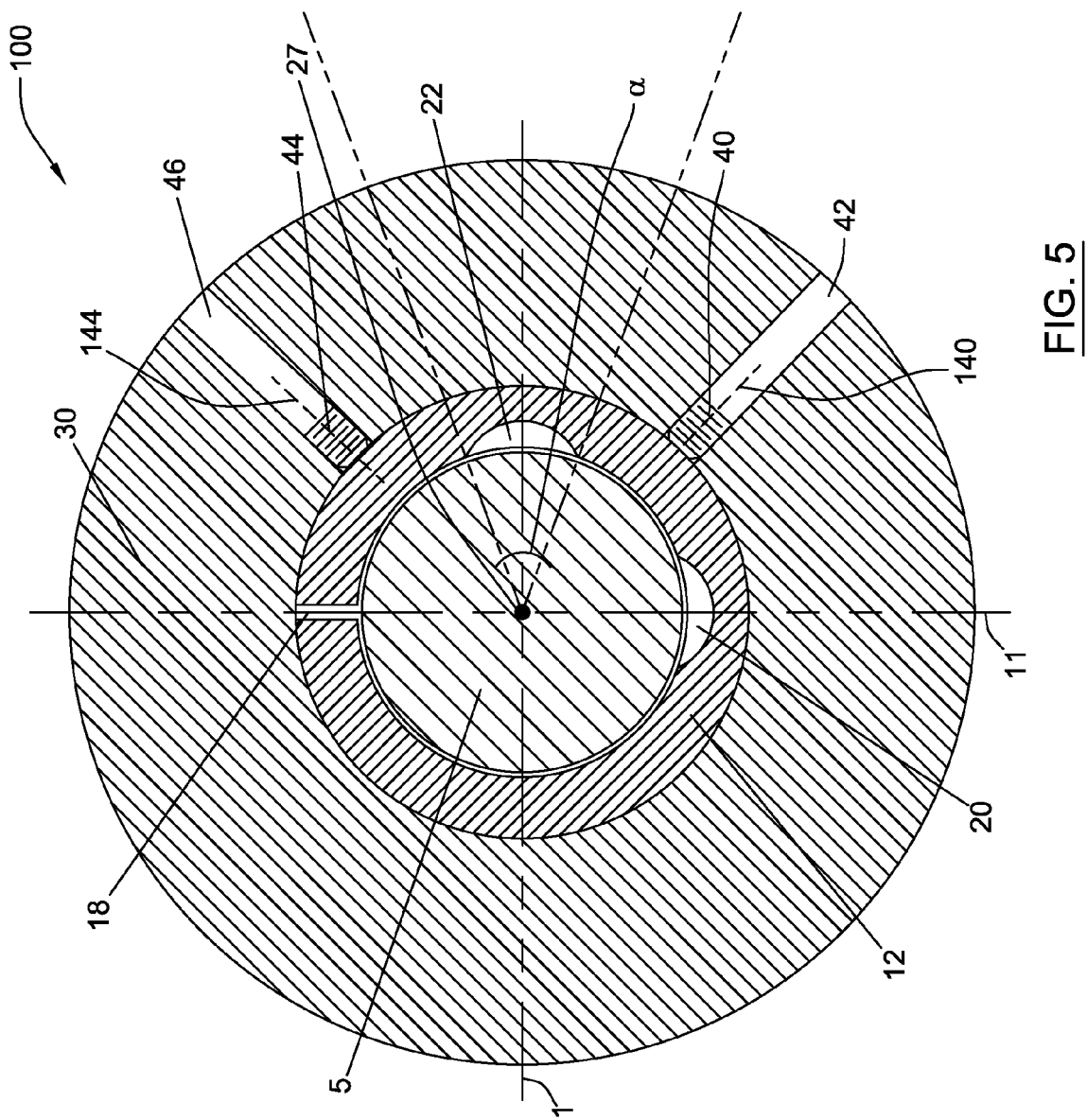
FIGS. 5-7 are transverse, sectional elevational views taken along lines 5-5 of FIG. 4 illustrating a securing of an apparatus relative to a bushing in one embodiment.

Referring to the cross-sectional views of FIGS. 5-7, system 100 can be arranged so that set screw 40 impinges on cylindrical body 12 at a radial position that is substantially equidistant from formation 20 and formation 22 and further so that set screw 44 impinges on cylindrical body 12 at a radial position that is substantially equidistant from formation 22 and slit 18.

Figure 8:
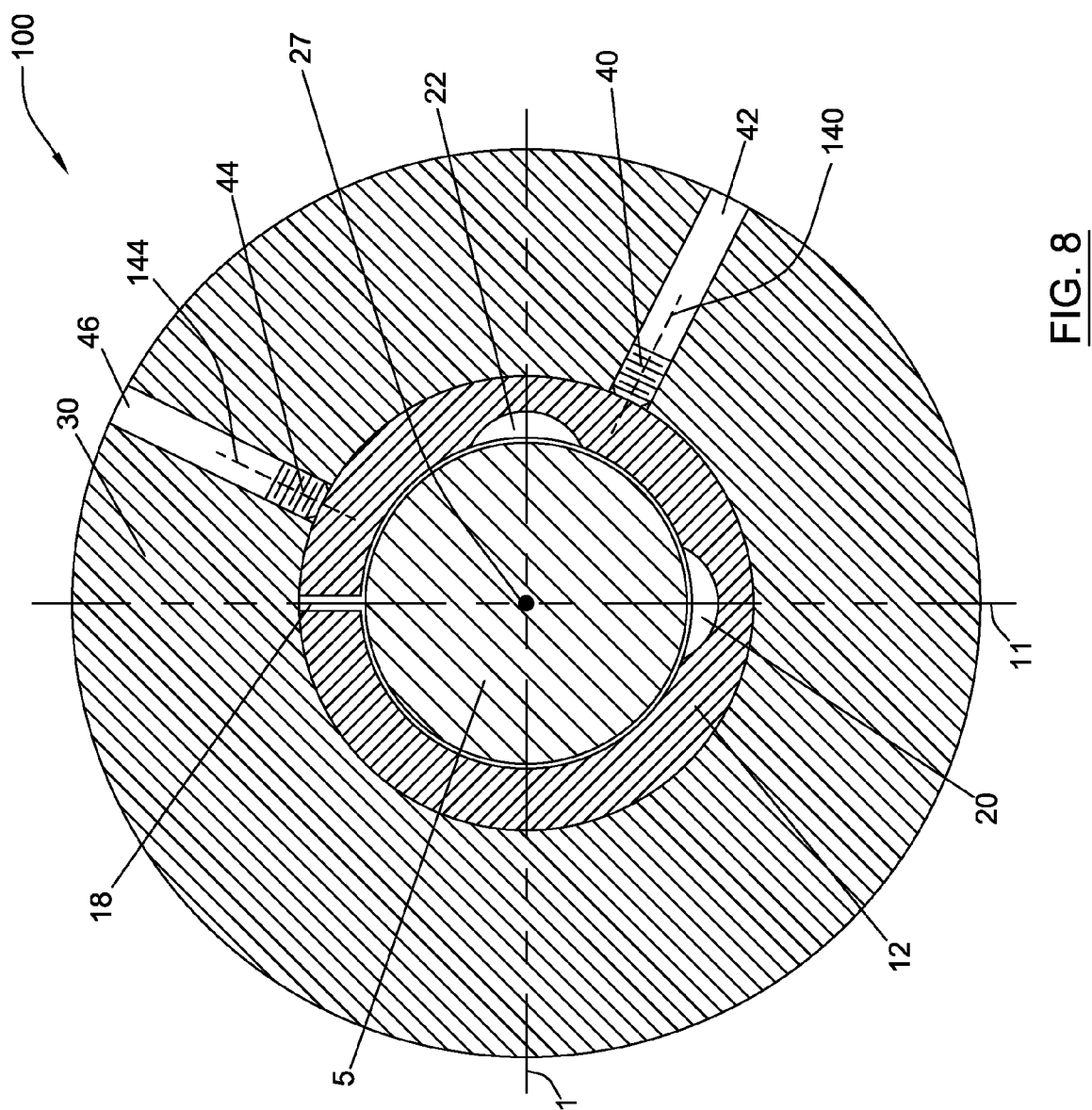
FIG. 8 is a transverse, sectional elevational view, illustrating an alternative embodiment of the invention shown in FIG. 4.
Figure 9:
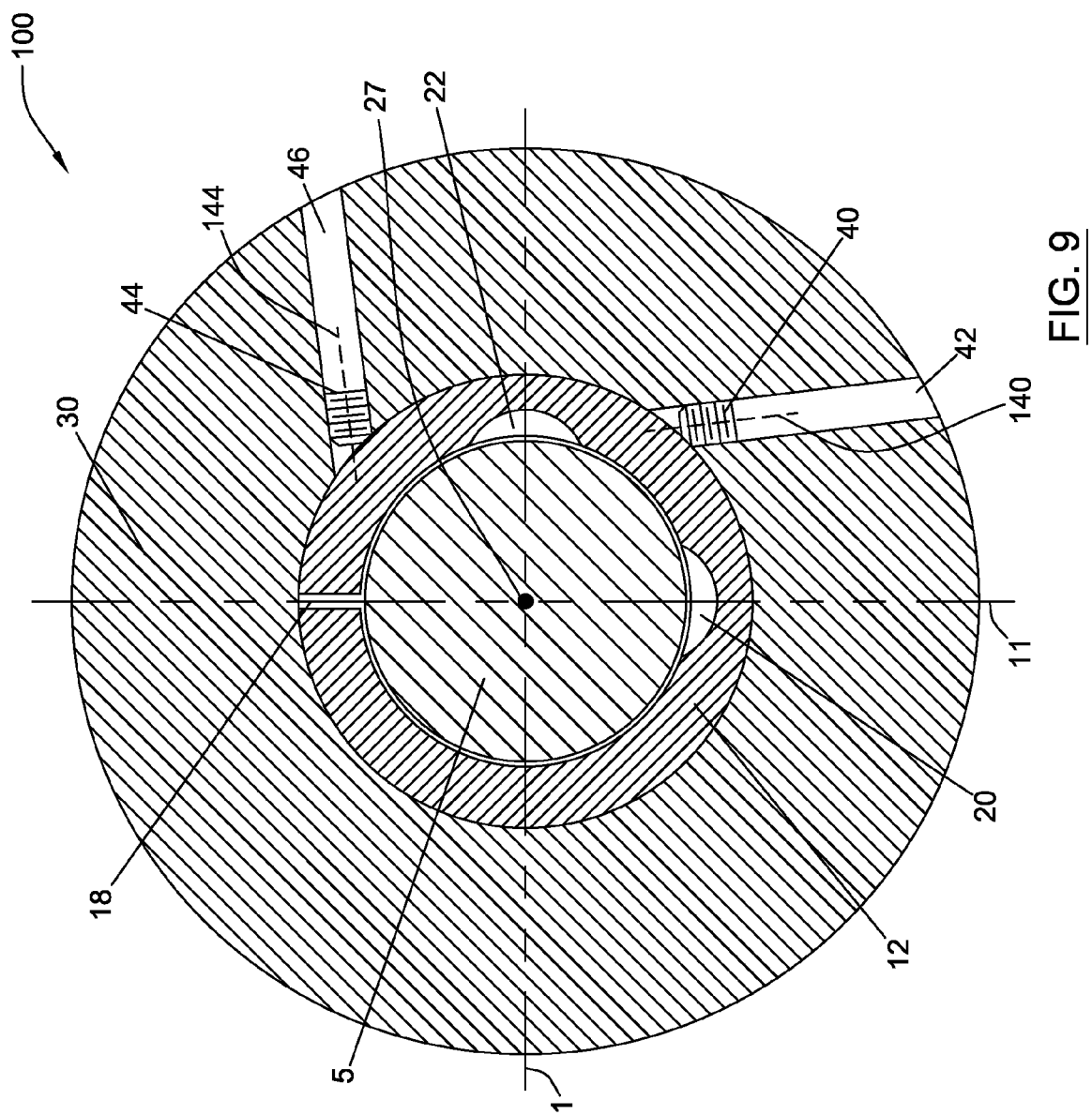
FIG. 9 is a transverse, sectional elevational view, illustrating an alternative embodiment of the invention shown in FIG. 4.

FIG. 8 shows another embodiment of a system 100 for securing an apparatus to a shaft. In comparison to set screws 40 and 44 of FIGS. 5-7 where the set screws 40 and 44 are generally aligned in a radial position substantially equidistant between formation 20 and 22 (set screw 40) and between formation 22 and slit 18 (set screw 44) tapped holes 42 and 46 and set screws 40 and 44 of the clamping system 100 of FIG. 9 are positioned at radial positions of cylindrical body 12 offset from a position equidistant from formation 20 and 22 (set screw 40) and offset from a radial position equidistant from formation 22 and slit 18 (set screw 44). In the specific arrangement shown in FIG. 9, set screw 40, when tightened, impinges on cylindrical body 12 at a radial position more proximate formation 22 than formation 20, and set screw 44 impinges on cylindrical body 12 at a radial position more proximate slit 18 than formation 22. Such arrangement can serve to increase clamping force, as the lever ratio of the bending portions of the bushing are increased.

In one embodiment, an axis of a set screw defining a set screw and tapped hole direction can substantially intersect an axis 27 of the bushing or can be offset from axis 27. Referring to FIG. 8, set screws 40 and 44 have axes 140, 144 which substantially intersect axis 27 of cylindrical body 12 and which intersect wall 26 of cylindrical body 12 at radial positions offset from a position equidistant from formation 22 and formation 22 (screw 40), and offset from a radial position equidistant from formation 22, and slit 18. FIG. 8 shows one embodiment where tapped holes 42 and 46 and set screws 40 and 44 extend along respective axes 140, 144 which substantially intersect axis 27 (as can be seen if a longer section of infinitely extending axes 140, 144 are considered).

FIG. 9 shows another embodiment of a system 100 for securing an apparatus to a shaft 5 where tapped holes 42 and 46 and set screws 40 and 44 extend along axis 140 and axis 144 respectively which are substantially offset from axis 27. In one embodiment, axis 140 and/or axis 144 can extend to locations when most proximate to axis 27 that are more proximal to inner surface 14 than axis 27.

Figure 10:
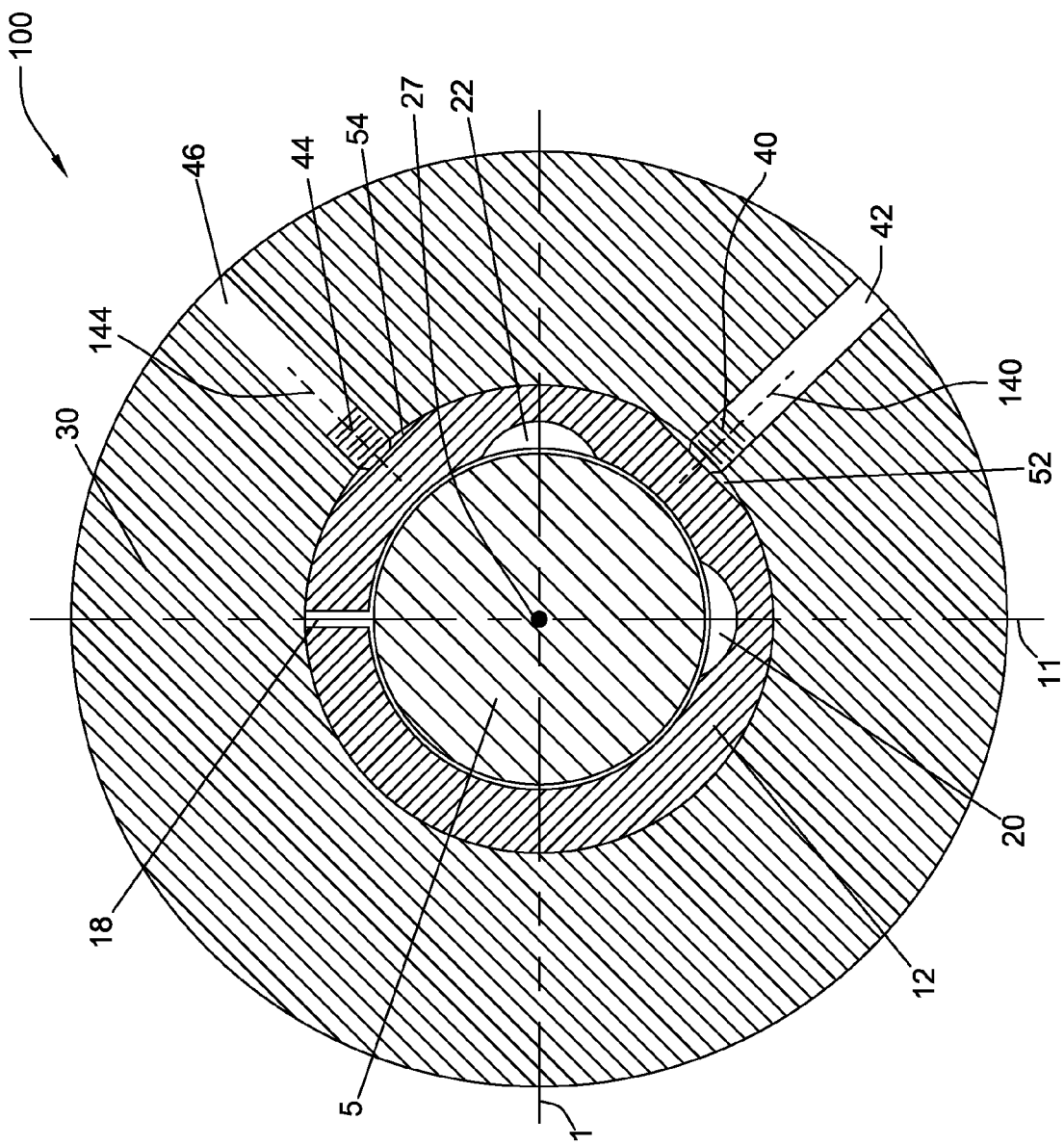
FIG. 10 is a transverse, sectional elevational view, illustrating an alternative embodiment of the invention shown in FIG. 4.

In one embodiment, longitudinally extending (flatted portion or flats) can be defined at outer surface 16 of cylindrical body 12 in positions corresponding to expected and desired set screw impingement points. FIG. 10 shows another embodiment of a system for securing an apparatus to a shaft wherein the bushing 10 has two flatted portions 52 and 54. Flatted portions 52 and 54 can longitudinally extend the length of bushing 10 or partially a length of bushing 10, and can serve to better radially align the bushing with set screws during assembly into an apparatus 30.

Compared to prior art designs, the described systems offer many advantages including the ability to utilize a variety of materials with different characteristics to meet necessary requirements. The system 100 described herein allows progressive clamping utilizing a single bushing and offers much improved clamping capabilities over all previous art. A bushing having two internal longitudinally extending formations and a longitudinally extending slit for inserting into the bore of a rotatable hub and is deformed into progressive clamping engagement with a shaft 5 with utilization of a first set screw which bears against the bushing between the first and second longitudinally extending formations 20, 22, and a second set screw 40 which bears against the bushing between the second longitudinally extending formation and the slit.

With further reference to cylindrical body 12 defining bushing 10, cylindrical body 12 in the various embodiments set forth herein can comprise metal, e.g., steel, aluminum, cast iron, and can be of unitary construction, i.e., can comprise a single piece of material. Regarding slit 18, slit 18 can be formed by e.g., casting, molding, or machining. Regarding formations 20, 22, formations 20, 22 can be formed by, e.g., by casting, molding, or machining Regarding set screws, axes 140, 144 of set screws 40, 44 defining a direction of set screws and holes 42, 46 can extend in directions in each described embodiment that is parallel to an arbitrary plane perpendicularly intersecting axis 27. Alternatively, axis 140 and axis 144 can extend in directions at an angle, e.g., more than 10 degrees from parallel, relative to such arbitrary plane. In one embodiment, slit 18, longitudinally extending formation 20 and longitudinally extending formation 22 can extend an entire length of bushing 10. In another embodiment, one or more of slit 18, formation 20, and formation 22 extend part of a length of bushing 10. In one example, for each of the embodiments of bushing 10 and/or system 100 described with reference to a cross-sectional view herein (FIGS. 5-10) the relative dimensions of features illustrated by the cross-sectional view can remain consistent throughout a length of the bushing 10 and/or system 100 depicted in the cross-sectional view.

Figure 11:
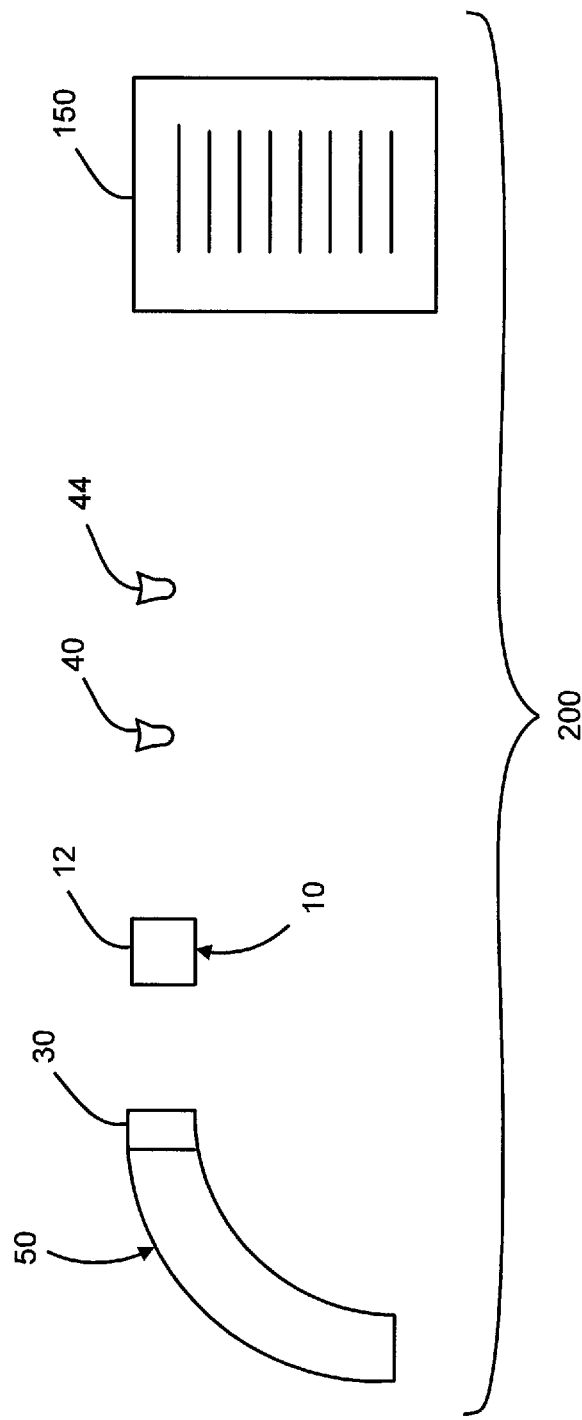
FIG. 11 is a schematic view of a kit for use in securing an apparatus relative to a shaft.

Referring to FIG. 11, there is shown a kit 200 comprising bushing 10 as set forth herein. Kit 200 can be utilized for securing an apparatus 30 to a shaft 5. In one embodiment, kit 200 can include apparatus 30. Apparatus 30 can be part of a larger assembly 50. In one embodiment, larger assembly 50 can be provided by a flexible coupling for providing coupling between a rotating shaft and a shaft to be rotated. In addition to including assembly 50 and bushing 10, kit 200 can comprise set screws 40, 44 and instruction manual 150. Instruction manual 150 can include one or more instructions for securing apparatus 30 to a shaft 5. In one embodiment, kit 200 can be provided without the elements of apparatus 30, assembly 50, and set screws 40, 44, and kit 200 can be used with such elements 30, 50, 40, 44 pre-existing in a work environment. In one embodiment, instruction manual 150 can comprise the instructions as listed in Table A.

TABLE A

1. Insert bushing 10 into apparatus 30 until the outer face of bushing 10 is flush with the outer face of apparatus 30.
2. Align bushing 10 such that set screw 40 is between longitudinally extending formations 20 and 22, and set screw 44 is between longitudinally extending formation 22 and slot 18.
3. Tighten set screw 40 to x inch/lbs. torque.
4. Tighten set screw 44 to y inch/lbs. torque.

In one embodiment, instruction manual 150 can include a subset of the instructions as are indicated in Table A, e.g., only one of the instructions, e.g., any one of the instructions. Regarding instruction 3 in the context of instruction 4 in the example of Table A, instruction 3 indicates that an area of the bushing between a longitudinally extending formation is to be clamped prior to a clamping at an area of the bushing between the supplementary longitudinally extending formation and a longitudinally extending slit on the bushing. Instruction manual 150 in the embodiment of FIG. 11 is paper based. However, in another embodiment, instruction manual 150 can be electronically displayed, e.g., stored in an HTML file on a remote website accessible with use of a personal computer disposed in proximity in the remaining elements of kit 200.

A prior art system for securing an apparatus in relation to a shaft 5 is shown in FIG. 12. When a shaft 5 is inserted into a bushing, there must be clearance between the two to allow such insertion. Such arrangement results in radial clearance all the way around the interface between the two. When the bushing is squeezed by an outside force such as a set screw to compress it onto the shaft, there exists the potential for only two points of line contact, with one point of contact 119 under the set screw as it compresses the bushing onto the shaft, and one point of contact 120, 180 degrees apart from that line of contact. If two set screws are used, set at some angle to each other, the possibility of three points of contact exists; however, distortion of the bushing during such compression makes this questionable. Some prior art bushings are equipped with dimples or longitudinal ribs defining an inner surface of a bushing for increasing a friction force between a bushing and a shaft. However, such dimples or ribs do not encourage preferential deformation of a bushing at a particular location.

In the present invention, where a first bushing portion can be collapsed onto a shaft, using a lever pivot point and set screw pressure, and then a second bushing portion can be collapsed onto a shaft using a second lever pivot point and set screw pressure, the creation of a minimum three longitudinal clamping surfaces is assured, and torque capacity of the assembled system is maximized.

In the embodiments of FIGS. 1-10, bushing 10 has two longitudinally extending formations. In another embodiment, bushing 10 can have a greater number of longitudinally extending formations, e.g., three to six formations allowing preferential deformation along the formations or a lesser number of formations allowing preferential deformation along the formation, e.g., 1. Regarding a bushing 10 having one or more longitudinally extending formation described herein, a bushing can be configured to allow preferential deformation along a longitudinally extending formation in response to a manually generated force, e.g., a force generated by driving a set screw through a hub to impart a force on an external surface of a bushing.

Without any longitudinally extending formations allowing preferential deformation of bushing 10 along a longitudinally extending formation, there can be expected to be at most two longitudinally regions of contact between bushing 10 and shaft 5 (see FIG. 12). By providing a single formation allowing preferential deformation along a longitudinally extending formation, the number of longitudinally extending regions of contact can be expected to remain at two. By including two longitudinally extending formations allowing preferential deformation along the two longitudinally extending formations, there can be expected to be at least three longitudinally extending regions of contact between bushing 10 and shaft 5. By providing additional longitudinally extending formations allowing preferential deformation along the longitudinally extending formation, the number of regions of contact increases. By maintaining the number of longitudinally extending formations at a limited number, e.g., six or less, bushing strength remains strong. In some applications it is desirable to include more than six longitudinally extending formations.

In one embodiment to maintain a strength of bushing 10 at a higher level and to improve contact between bushing 10 and shaft 5, bushing 10 can be provided so that a percentage of radians of bushing 10 corresponding to preferentially deforming formations of bushing 10 is less than a percentage of radians corresponding to areas of bushing 10 external to preferentially deforming formations. Referring to FIG. 5, similarly configured formation 20 and formation 22, as indicated by the angle, α, can extend 45 degrees ($0.25\pi$ radians) of bushing (90 total degrees, $0.5\pi$ radians) while areas of bushing 10 external to formations 20, 22 extend 270 degrees ($1.5\pi$ radians) of bushing 10. A radian ratio of non-formation areas to formation areas is 4:1. In another embodiment, the radian ratio can be N:1, where $1 \leq N \leq 100$. In one embodiment, $2 \leq N \leq 10$. In a more specific embodiment $2 \leq N \leq 5$.

By maintaining the radian ratio of non-formation areas to formation areas at or above 1 as in the exemplary embodiment, structural strength of bushing 10 is improved and areas of surfaces providing contact with shaft 5 is increased.

A small sample of system methods and apparatus are described herein as follows:

A1. A bushing comprising:
a longitudinally extending cylindrical body having an inner surface and an outer surface, the longitudinally extending cylindrical body further having a longitudinally extending slit;
a longitudinally extending formation formed on the longitudinally extending cylindrical body, wherein the longitudinally extending formation is located at a radial position of the longitudinally extending cylindrical body that is spaced apart from a radial position of the longitudinally extending slit, and wherein the longitudinally extending cylindrical body is configured so that the longitudinally extending cylindrical body preferentially deforms along the longitudinally extending formation.

A2. The bushing of A1, wherein the longitudinally extending cylindrical body is defined by a wall having a longitudinally extending slit.

A3. The bushing of A1, wherein the bushing further includes a supplementary longitudinally extending formation, the supplementary longitudinally extending formation being located at a radial position of the cylindrical body that is spaced apart from a radial position of each of the longitudinally extending slit and the longitudinally extending formation, wherein the longitudinally extending cylindrical body is configured to preferentially deform along the longitudinally extending formation and along the supplementary longitudinally extending formation.

A4. The bushing of A3, wherein the longitudinally extending formation is disposed at a radial position of the longitudinally extending cylindrical body substantially opposite a radial position of the longitudinally extending slit, and wherein the supplementary longitudinally extending formation is disposed at a radial position of the cylindrical body of about 90 degrees from each of the longitudinally extending slit and the longitudinally extending formation.

A5. The bushing of A1, wherein the longitudinally extending formation is disposed at a radial position of the cylindrical body substantially opposite a radial position of the longitudinally extending slit.

A6. The bushing of A1, wherein the longitudinally extending formation has an arcuate cross-section.

A7. The bushing of A1, wherein the longitudinally extending formation has a rectilinear cross-section.

A8. The bushing of A1, wherein the longitudinally extending cylindrical body is of unitary construction.

A9. The bushing of A1, wherein the longitudinally extending formation partially defines the inner surface of the longitudinally extending cylindrical body.

A10. The bushing of A1, wherein the longitudinally extending cylindrical body includes a longitudinally extending flat partially defining the outer surface of the longitudinally extending cylindrical body, the longitudinally extending flat for use in aiding a rotational alignment of the bushing.

A11. The bushing of A1, wherein the bushing further includes a supplementary longitudinally extending formation, the supplementary longitudinally extending formation being located at a radial position of the cylindrical body that is spaced from a radial position of each of the longitudinally extending slit and the longitudinally extending formation, wherein the longitudinally extending cylindrical body is configured to preferentially deform along the longitudinally extending formation and along the supplementary longitudinally extending formation, wherein the longitudinally extending formation is disposed at a radial position of the longitudinally extending cylindrical body substantially opposite a radial position of the longitudinally extending slit, and wherein the supplementary longitudinally extending formation is disposed at a radial position of the cylindrical body of about 90 degrees from each of the longitudinally extending slit and the longitudinally extending formation, wherein the longitudinally extending cylindrical body includes a longitudinally extending flat partially defining the outer surface of the longitudinally extending cylindrical body, the longitudinally extending flat for use in aiding a rotational alignment of the bushing.

A12. The bushing of A3, wherein the bushing includes a further supplementary longitudinally extending formation, the further supplementary longitudinally extending formation being located at a radial position of the cylindrical body that is spaced apart from a radial position of each of the longitudinally extending formations and the supplementary longitudinally extending formation, wherein the longitudinally extending cylindrical body is configured to preferentially deform along the further supplementary longitudinally extending formation.

A13. The bushing of A1, wherein the bushing includes a plurality of spaced apart longitudinally extending formations including the longitudinally extending formation.

A14. The bushing of A13, wherein a count of the plurality of longitudinally extending formations is an integer between 1 and 6.

A15. The bushing of A13, wherein a count the plurality of longitudinally extending formations is an integer between 2 and 3.

A16. The bushing of A1, wherein the bushing has one or more formation, including the longitudinally extending formation, for providing preferential deformation of the bushing, and wherein a percentage of radians corresponding to areas of the bushing external to the one or more formations is greater than a percentage of radians corresponding to the one or more formations.

A17. The bushing of A16, wherein a radian ratio of areas of the bushing external to the one or more formation to areas of the bushing corresponding to the one or more formation is N:1, where 1≤N.

A18. The bushing of A16, wherein a radian ratio of areas of the bushing external to the one or more formation to areas of the bushing corresponding to the one or more formation is N:2, where 2≤N.

A19. The bushing of A1, wherein the longitudinally extending cylindrical body is configured so that the longitudinally extending cylindrical body preferentially deforms along the longitudinally extending formation responsively to a manually generated force being imparted to the outer surface.

B1. A method for attaching a hub equipped apparatus to a shaft, the hub having a bore, the method comprising:
providing a bushing, the providing including the providing the bushing to include a longitudinally extending formation formed on the longitudinally extending cylindrical body, wherein the longitudinally extending formation located at a radial position on the cylindrical body spaced apart from a radial position of the longitudinally extending slit, and wherein the longitudinally extending cylindrical body is configured so that the longitudinally extending cylindrical body preferentially deforms along the longitudinally extending formation, wherein the providing further includes providing the bushing to include a supplementary longitudinally extending formation, the supplementary longitudinally extending formation being spaced apart from the first longitudinally extending formation and being more proximal to the slit than the first longitudinally extending formation.

arranging the hub and bushing so that the hub is disposed about the bushing;
imparting a force to the bushing at a first radial position intermediate the first and supplementary longitudinally extending formation;
imparting a force to the bushing at a second radial position intermediate the supplementary longitudinally extending formation and the longitudinally extending slit.

B2. The method of B1, wherein imparting a force to the bushing at a first radial position is performed prior to the imparting a force to the bushing at a second radial position.

B3. The method of B1, wherein the imparting a force to the bushing at the first radial position is provided by driving of a set screw through the hub.

C1. A system comprising:
an apparatus having a central bore;
a bushing adapted to be disposed within the central bore;
wherein the bushing includes a longitudinally extending cylindrical body having an inner surface and an outer surface, the longitudinally extending cylindrical body further having a longitudinally extending slit;
wherein the bushing includes a longitudinally extending formation formed on the longitudinally extending cylindrical body, wherein the longitudinally extending formation is located at a radial position of the cylindrical body that is spaced apart from a radial position of the longitudinally extending slit, and wherein the longitudinally extending cylindrical body is configured so that the longitudinally extending cylindrical body preferentially deforms along the longitudinally extending formation,
wherein the bushing further includes a supplementary longitudinally extending formation, the supplementary longitudinally extending formation being located at a radial position of the cylindrical body that is spaced from a radial position of each of the longitudinally extending slit and the longitudinally extending formation, wherein the radial position of the supplementary longitudinally extending formation is more proximate a radial position of the slit than radial position of the longitudinally extending formation, wherein the longitudinally extending cylindrical body is configured to preferentially deform along the longitudinally extending formation and along the supplementary longitudinally extending formation.

C2. The system of C1, wherein the longitudinally extending cylindrical body is defined by a wall of unitary construction having a longitudinally extending slit.

C3. The system of C2, wherein the longitudinally extending formation is disposed at a radial position of the longitudinally extending cylindrical body substantially opposite a radial position of the longitudinally extending slit, and wherein the supplementary longitudinally extending formation is located at a radial position of the cylindrical body of about 90 degrees from each of the longitudinally extending slit and the longitudinally extending formation.

C4. The system of C1, wherein the longitudinally extending formation is located at a radial position of the cylindrical body substantially opposite a radial position of the longitudinally extending slit.

C5. The system of C1, wherein the longitudinally extending formation has an arcuate cross-section.

C6. The system of C1, wherein the longitudinally extending formation has a rectilinear cross-section.

C7. The system of C1, wherein the apparatus has a first tap hole for orienting a first screw so that the first screw can impinge on the longitudinally extending cylindrical body at a first position intermediate the radial position at which the longitudinally extending formation is located and the radial position at which the longitudinally extending formation is located, and wherein the apparatus has a second tap hole for orienting a second screw so that the second screw can impinge on the longitudinally extending cylindrical body at a second position intermediate of the radial position at which the second longitudinally extending formation is located and the radial position at which the longitudinally extending formation is located.

C8. The system of C1, wherein the apparatus includes first and second tap holes for orienting screws at respective radial position of the bushing that are about 90 degrees apart.

C9. The system of C1, wherein the apparatus has a screw driven therethrough that impinges on the bushing, the screw having an axis that extends substantially through an axis of the longitudinally extending cylindrical body.

C10. The system of C1, wherein the apparatus has a screw driven therethrough that impinges on the bushing, the screw having a screw axis that extends in a direction such that at a minimum spacing distance with an axis of the longitudinally extending cylindrical body, the screw axis is closer to the inner surface than the axis of the longitudinally extending cylindrical body.

C11. The system of C1, wherein the apparatus has first and second screws extending therethrough, the first screw impinging on the bushing at a radial position of the bushing between the longitudinally extending formation and the supplementary longitudinally extending formation proximate the second screw impinging on the bushing at a radial position between the supplemental longitudinally extending formation at the longitudinally extending slit.

C12. The system of C1, wherein the first longitudinally extending formation and the supplementary longitudinally extending formation partially define the inner surface, wherein the longitudinally extending cylindrical body has a longitudinally extending flat partially defining the outer surface and disposed at a radial position of the bushing between the radial position at which the longitudinally extending formation is located and the radial position of which the supplementary extending formation is located.

C13. The system of C1, wherein the system further includes an instruction manual including at least the instruction indicating that an area of the bushing between the longitudinally extending formation and the supplementary longitudinally extending formation is to be clamped prior to a clamping at an area of the bushing between the supplementary longitudinally extending formation and the longitudinally extending slit.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been described, it will be understood that features and aspects that have been described with reference to each particular embodiment can be used with each remaining particularly described embodiment.

I claim:

1. A system comprising:
   a bushing, wherein the bushing includes:
      a longitudinally extending hollow cylindrical body defining a center axis therethrough, the body comprising a wall having an inner surface and an outer surface, the longitudinally extending cylindrical body further having a longitudinally extending slit formed through said wall;
      a longitudinally extending formation recessed in the inner surface of the wall of the longitudinally extending cylindrical body, wherein the longitudinally extending formation is located at a circumferential position of the cylindrical body that is substantially opposite a circumferential position of the longitudinally extending slit; and
      a supplementary longitudinally extending formation recessed in the inner surface of the wall, the supplementary longitudinally extending formation being located at a circumferential position of the cylindrical body that is spaced from a circumferential position of each of the longitudinally extending slit and the longitudinally extending formation, wherein the circumferential position of the supplementary longitudinally extending formation is intermediate a circumferential position of the slit and a circumferential position of the longitudinally extending formation,
      wherein the longitudinally extending slit, the longitudinally extending formation and the supplementary longitudinally extending formation extend an entire length of the longitudinally extending cylindrical body; and
   an apparatus, the apparatus comprising: a central through-bore receiving the bushing therein, and an outer wall surrounding the central through-bore, the outer wall comprising:
      a first set screw movably engaged in a first hole formed in the outer wall, wherein the first set screw is directed at the outer surface of the bushing at a first circumferential position between the circumferential positions of the longitudinally extending formation and the supplemental longitudinally extending formation, and
      a second set screw movably engaged in a second hole formed in the outer wall, wherein the second set screw is directed at the outer surface of the bushing at a second circumferential position between the circumferential positions of the supplementary longitudinally extending formation and the longitudinally extending slit;
   wherein when the first and second set screws are engaged so as to impinge on the outer surface of the bushing, the cylindrical body of the bushing deforms along the longitudinally extending formation and the supplementary longitudinally extending formation substantially toward the center axis.

2. The system of claim 1, wherein the supplementary longitudinally extending formation is located at a circumferential position of the cylindrical body of about 90 degrees from each of the longitudinally extending slit and the longitudinally extending formation.

3. The system of claim 1, wherein at least one of the longitudinally extending formation and the supplementary longitudinally extending formation has an arcuate cross-section.

4. The system of claim 1, wherein at least one of the longitudinally extending formation and the supplementary longitudinally extending formation has a rectilinear cross-section.

5. The system of claim 1, wherein the apparatus includes first and second tap holes for orienting screws at respective radial positions of the bushing that are about 90 degrees apart.

6. The system of claim 1, wherein at least one of the first and second set screws extends along an axis that extends substantially towards the center axis.

7. The system of claim 1, wherein at least one of the first and second screws extends along a screw axis that extends in a direction such that at a minimum spacing distance with an axis of the longitudinally extending cylindrical body, the screw axis is closer to the inner surface than a central axis of the longitudinally extending cylindrical body.

8. The system of claim 1, wherein the longitudinally extending cylindrical body has a longitudinally extending flat partially defining the outer surface and disposed at a radial position of the bushing between the radial position at which the longitudinally extending formation is located and the radial position of which the supplementary longitudinally extending formation is located.

9. The system of claim 1, wherein the system further includes an instruction manual including at least the instruction indicating that an area of the bushing between the longitudinally extending formation and the supplementary longitudinally extending formation is to be clamped prior to a clamping at an area of the bushing between the supplementary longitudinally extending formation and the longitudinally extending slit.

10. The system of claim 1, wherein the longitudinally extending formation and the supplementary longitudinally extending formation extend less than an entire thickness of a wall defining the longitudinally extending cylindrical body.

11. The system of claim 1, wherein the longitudinally extending slit, the longitudinally extending formation and the supplementary longitudinally extending formation extend an entire length of the longitudinally extending cylindrical body.

12. The system of claim 1, wherein the longitudinally extending cylindrical body is of unitary construction.

13. The system of claim 1, wherein the longitudinally extending cylindrical body includes a longitudinally extending flat partially defining the outer surface of the longitudinally extending cylindrical body, the longitudinally extending flat for use in aiding a rotational alignment of the bushing.

14. The system of claim 1, wherein the bushing includes a plurality of spaced apart, longitudinally extending formations including the longitudinally extending formation and the supplementary longitudinally extending formation.

15. The system of claim 14, wherein a count of the plurality of spaced apart longitudinally extending formations is an integer selected from the group consisting of 2, 3, 4 and 5.

16. The system of claim 14, wherein a count of the plurality of spaced apart longitudinally extending formations is 2 or 3.

17. The system of claim 1, wherein the bushing has one or more formations, including the longitudinally extending formation, for providing deformation of the bushing, and wherein a percentage of radians corresponding to areas of the bushing external to the one or more formations is greater than a percentage of radians corresponding to the one or more formations.

18. The system of claim 17, wherein a radian ratio of areas of the bushing external to the one or more formation to areas of the bushing corresponding to the one or more formation is N:1, where 1≤N.

19. The system of claim 17, wherein a radian ratio of areas of the bushing external to the one or more formation to areas of the bushing corresponding to the one or more formation is N:2, where 2≤N.

* * * * *